United States Patent
Goeters

(10) Patent No.: US 10,891,262 B2
(45) Date of Patent: Jan. 12, 2021

(54) COMPRESSION OF DATA ATTRIBUTES

(71) Applicant: NEOPOST TECHNOLOGIES, Bagneux (FR)

(72) Inventor: Jeff Goeters, Chicago, IL (US)

(73) Assignee: QUADIENT TECHNOLOGIES FRANCE, Bagneux (FR)

( * ) Notice: Subject to any disclaimer, the term of this patent is extended or adjusted under 35 U.S.C. 154(b) by 182 days.

(21) Appl. No.: 16/229,543

(22) Filed: Dec. 21, 2018

(65) Prior Publication Data
US 2020/0004728 A1    Jan. 2, 2020

Related U.S. Application Data

(60) Provisional application No. 62/691,062, filed on Jun. 28, 2018.

(51) Int. Cl.
| | | |
|---|---|---|
| *G06F 16/174* | (2019.01) | |
| *G06F 16/387* | (2019.01) | |
| *G06Q 10/08* | (2012.01) | |

(52) U.S. Cl.
CPC ...... *G06F 16/1748* (2019.01); *G06F 16/1744* (2019.01); *G06F 16/387* (2019.01); *G06Q 10/083* (2013.01)

(58) Field of Classification Search
CPC .... G06F 16/1748; G06F 7/06; G06F 16/1744; G06F 16/387; G06F 17/1744; G06Q 10/083
USPC ....................................................... 707/692
See application file for complete search history.

(56) References Cited

U.S. PATENT DOCUMENTS

| | | | | |
|---|---|---|---|---|
| 4,506,330 A * | 3/1985 | Dlugos | ............ | G07B 17/00024 177/25.15 |
| 4,988,125 A * | 1/1991 | Calhoun | ................ | B42D 15/00 283/32 |
| 5,249,687 A * | 10/1993 | Rosenbaum | .............. | B07C 3/00 209/3.3 |
| 5,612,889 A * | 3/1997 | Pintsov | ................ | G06Q 20/401 700/226 |
| 6,035,289 A * | 3/2000 | Chou | .................... | G06Q 30/08 705/35 |
| 6,365,862 B1 * | 4/2002 | Miller | ....................... | B07C 3/02 209/584 |
| 6,366,995 B1 * | 4/2002 | Vilkov | ................... | G11C 29/72 711/206 |
| 6,557,755 B1 * | 5/2003 | Pickering, Jr. | ... | G07B 17/00024 235/376 |
| 7,363,233 B1 * | 4/2008 | Levine | ................... | G06Q 10/04 705/1.1 |
| 7,421,397 B2 * | 9/2008 | Podgurny | ............. | G06Q 10/08 705/335 |

(Continued)

OTHER PUBLICATIONS

Extended European Search Report for Application No. EP19305860.9, dated Nov. 21, 2019, 11 pages.

(Continued)

*Primary Examiner* — Phuong Thao Cao
(74) *Attorney, Agent, or Firm* — Butzel Long

(57) ABSTRACT

Systems and techniques for compressing shipping data are provided. Origin/destination location code pairs are arranged, compressed, and de-duplicated to provide data files that can be processed and updated efficiently regardless of the number of location codes used or updated.

15 Claims, 4 Drawing Sheets

(56) References Cited

U.S. PATENT DOCUMENTS

| | | | | |
|---|---|---|---|---|
| 8,068,490 | B1* | 11/2011 | Yelamanchi | H04L 12/18 370/390 |
| 9,021,454 | B2* | 4/2015 | Yohn | G06F 9/4552 717/151 |
| 9,047,329 | B1* | 6/2015 | Tyson | G06F 16/9017 |
| 9,047,607 | B1* | 6/2015 | Curial | G06Q 30/00 |
| 10,373,099 | B1* | 8/2019 | McCardel | G06Q 10/0833 |
| 2002/0032573 | A1* | 3/2002 | Williams | G06Q 10/08 705/335 |
| 2002/0143521 | A1* | 10/2002 | Call | G06F 40/14 704/1 |
| 2004/0015892 | A1* | 1/2004 | Batthish | G06F 8/425 717/137 |
| 2004/0054549 | A1* | 3/2004 | Chittenden | G01C 21/20 705/338 |
| 2005/0176450 | A1* | 8/2005 | Bantukul | H04W 4/14 455/466 |
| 2005/0197892 | A1* | 9/2005 | Bilibin | G06Q 10/025 705/13 |
| 2007/0299686 | A1* | 12/2007 | Hu | G06Q 20/20 705/407 |
| 2010/0153148 | A1 | 6/2010 | Johnson | |
| 2010/0274609 | A1* | 10/2010 | Shoemaker | G06Q 10/08 705/333 |
| 2011/0153513 | A1* | 6/2011 | Erie | G06Q 10/08345 705/335 |
| 2014/0330741 | A1* | 11/2014 | Bialynicka-Birula | G06Q 10/0838 705/341 |
| 2015/0248639 | A1* | 9/2015 | Maney | G06Q 10/08345 705/335 |
| 2016/0171440 | A1* | 6/2016 | Durai Raj | G06Q 10/08355 705/338 |
| 2017/0061367 | A1* | 3/2017 | Zhang | G06F 16/29 |
| 2017/0206500 | A1* | 7/2017 | Deshpande | G06Q 10/0633 |
| 2017/0337156 | A1* | 11/2017 | Yadavalli | G06F 9/30149 |
| 2018/0165635 | A1* | 6/2018 | Modica | H04L 29/08 |

OTHER PUBLICATIONS

Anonymous: "Hash function—Wikipedia", Jul. 4, 2013 (Jul. 4, 2013), XP055606186, Retrieved from the Internet: URL: https://en.wikipedia.org/w/index.php?t itle=Hash function&oldid=562861545 [retrieved on Jul. 16, 2019].

Anonymous: "Data deduplication—Wikipedia", Old revision of Wikipedia page, Jul. 12, 2015 (Jul. 12, 2015), XP055476714, Retrieved from the Internet: URL:https://en.wikipedia.org/w/index.php?t itle=Datadeduplication&oldid=671127961 [retrieved on May 18, 2018].

* cited by examiner

Populated binary array

FIG. 3

```
ozip[00001] = 0         ozip[00001] = 0
...                     ...
ozip[01088] = 0         ozip[01088] = 0
ozip[01089] = 1         ozip[01089] = 1
ozip[01090] = 2   =>    ozip[01090] = 1
ozip[01091] = 3         ozip[01091] = 1
ozip[01092] = 0         ozip[01092] = 0
...                     ...
ozip[99999] = 0         ozip[99999] = 0
```

Simplification of duplicate origin pointers

COMPRESSION OF DATA ATTRIBUTES

CROSS-REFERENCE TO RELATED APPLICATION

This application is a non-provisional of, and claims the priority benefit to U.S. Provisional Patent Application Ser. No. 62/691,062, filed Jun. 28, 2018, the disclosure of which is incorporated by reference in its entirety.

BACKGROUND

Package and mail carriers such as UPS, FedEx, the U.S. Postal Service (USPS), and the like, often provide data about service availability in the various geographic regions based on a "from-code" and "to-code" combination. For example, in the United States, service availability may be provided based on combinations of origin/destination ZIP codes. In many cases, for even a small subset of the origin ZIP codes of a relatively large client, the resultant set of possible origin/destination pairs is a tremendous size and may present a challenge to use in computer memory, or in a resource-sensitive environment such as a multi-tenant cloud host.

BRIEF SUMMARY

Systems, methods, and products for efficiently compressing data are provided. Embodiments disclosed herein may obtain an initial set of origin/destination shipping location code pairs, each pair of which includes an origin code indicating a geographic origin location from which a mailpiece can be shipped and a destination code indicating a geographic destination location to which a mailpiece can be delivered. An ordered list of the shipping location code pairs may be generated based upon the origin code for each pair, and one or more break points may be identified in the ordered list at which attributes for consecutively-ordered origin/destination shipping location code pairs change. A translation array of initial origin shipping location codes may be generated based upon the ordered list, each of which is the first origin shipping location code occurring after one of the break points. A destination code array of of destination shipping location codes may be generated in which destination shipping location codes in use are numbered in order. An origin code array of origin shipping location codes also may be generated that indicates origin shipping location codes that have attributes associated with them. The translation array, the destination code array, and the origin code array then may be provided to a shipping selection system or other system for further use. The shipping selection system may be configured to use the translation array, the destination code array, and the origin code array to identify and provide shipping options to a shipper in response to a request to ship a mailpiece.

BRIEF DESCRIPTION OF THE DRAWINGS

FIG. 2 shows an example of a populated binary array according to an embodiment disclosed herein.

FIG. 3 shows an example of a transformation of an origin pointer matrix to a de-duplicated output pointer matrix according to an embodiment disclosed herein.

DETAILED DESCRIPTION

Figure 1:
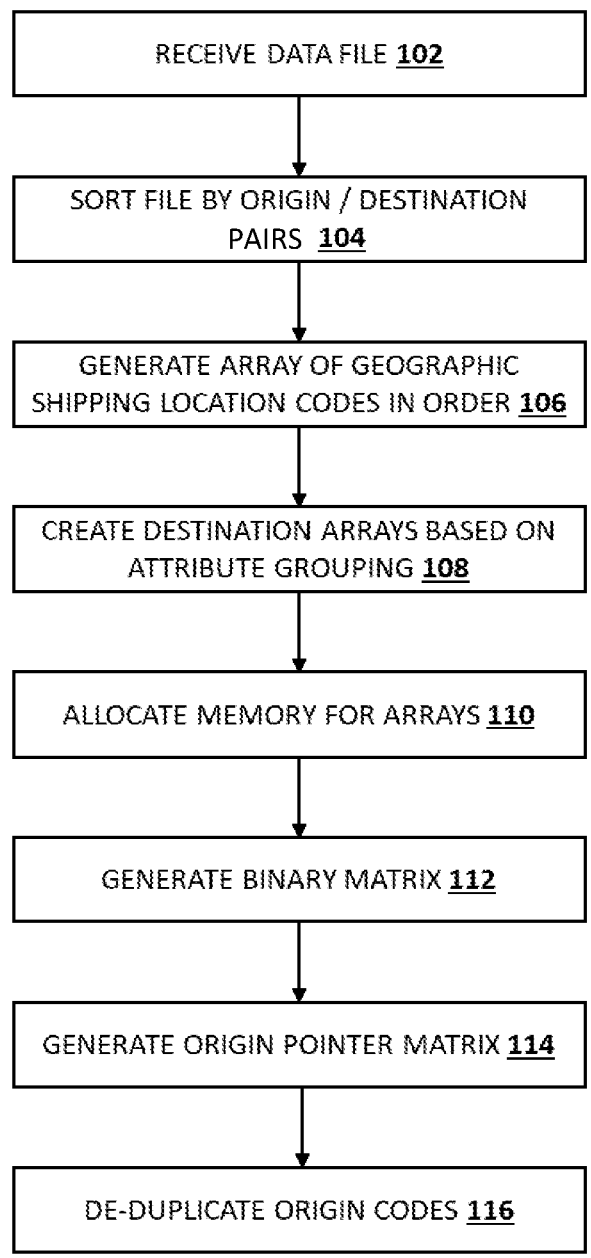
FIG. 1 shows an example process for compressing data according to an embodiment disclosed herein.

As previously disclosed, the set of possible origin/destination code pairs for a particular region may be very large and may present a challenge to use in computer memory, or in a resource-sensitive environment such as a multi-tenant cloud host. Accordingly, there is a need for a very compact structure of such data that remains effective to use.

For example, a large department store, mail-order delivery enterprise, or other volume shipper may use an electronic postage and shipping system to ship packages to customers. Such a system may receive computerized data of origin/destination location code pairs, expected shipping costs and transit times, and other information. As used herein, a "location code" refers to a code assigned to a geographic location, such as ZIP codes used in the U.S. and other similar postal codes used in other countries. Location codes also may be assigned to other locations or sub-locations and provide additional geographic information, such as an indication of a particular building or suite at an address having multiple buildings or suites, individual apartments or other locations, or the like, such as the ZIP+4 code used in the U.S. In general, each carrier may offer different pricing and attributes for different combinations of origin and destination location codes. For example, a carrier may maintain or receive a list of every ZIP code to which one or more shippers can ship, to determine which specific store may be able to deliver a particular order to a customer the fastest based on expected delivery times, shipping options available at each source and destination, and the like. In conventional shipping systems, if a carrier makes any change to the attributes, available services, or other data for any origin and/or delivery location that affects ZIP code arrangement, delivery time, available service levels, or the like, the shipper's automated system will need to receive and process an appropriate update. For example, even adding a single delivery truck, route, or schedule to a delivery region may impact the origin/destination shipping data for many origin/destination pairs due to the large number of shipping routes and options that may be impacted by the change.

Data sets provided by carriers such as the USPS, UPS, and the like may be relatively large, as they may include data for all ZIP codes, delivery times, available service levels, and the like, regardless of which data has or has not changed since the previous data was provided to a particular shipper. For example, only a relatively small number of ZIP codes or origin/destination ZIP code pairs may be affected by changes that occur between consecutive versions of a carrier's data file or set of data files, but the total file size remains quite large and the carrier typically provides only the entire file to shippers, as opposed to providing only a list of the changes that have been made since the prior version. Processing time for such a data set also may be very high. As such, it may be desirable to compress this data using an algorithm tailored to the specific format and content of the data. Because the data is always in a known format and has known attributes for geographic areas, it may be possible to achieve higher compression using a custom, tailored technique than would otherwise be possible using conventional compression techniques. Accordingly, techniques disclosed herein allow the systems that receive, compress, and use this data to operate much more efficiently than conventional techniques would allow. In contrast, techniques disclosed herein likely would be much less efficient, or entirely unsuited for compression of arbitrary data.

Techniques disclosed herein also allow for improved processing and distribution time when the underlying data is updated. For example, when a data update is received, a compressed version of the data may be distributed to users instead of the entire original updated data set. This may achieve significant bandwidth savings as well as processing time. For example, a typical data file may be about 2 GB or more in size, whereas the equivalent compressed version may be around 500 kb-1 MB. Systems and techniques disclosed herein may be particularly suited to compressing large amounts of data related to shipping location code pairs and attributes associated therewith. Conventional compression techniques typically treat such data as generic text data and use generic compression algorithms to reduce the size of data files. In contrast, techniques and systems disclosed herein take advantage of the groupings and divisions that result from typical location code assignment algorithms, thereby providing improved compression over conventional generic compression techniques. More specifically, embodiments disclosed herein may operate by identifying similar data and replacing it with a shorter marker that can "expand" to the original size when needed. The particular type of data to be used also has a tie-in to geographical markers, and such, there is additional specialized compression that may be used to take advantage of anomalies with geography. Such techniques may provide particular benefit over current computerized systems for obtaining, using, and providing shipping options to end users, which typically must process entire data files from carriers before providing the various shipping options. As such, embodiments disclosed herein may provide significant efficiency improvements to computerized shipping systems or systems that interface with computerized shipping systems, such as inventory management systems, online retailers, online shipping and postage systems, and the like.

FIG. 1 shows an example process for compressing such data according to an embodiment disclosed herein. At 102, a data file is received that includes data for combinations of an origin and a destination, with attributes for each combination. The file may provide, for example, a listing of geographic codes for multiple origin/destination pairs. Attribute information may be provided for each pair. For example, the input file may be a comma-separated list of data as shown in Table 1, which includes an origin code, a destination code, the number of business days in transit, and the availability of 3-day and/or ground Saturday delivery for one or more services by an example carrier:

TABLE 1

| Origin Code | Dest. Code | State | Transit Days | Sat 3-Day | Sat Ground |
|---|---|---|---|---|---|
| 01089 | 00501 | NY | 1 | | |
| 01089 | 00544 | NY | 1 | | |
| 01089 | 00601 | PR | 5 | | Y |
| 01089 | 00602 | PR | 5 | | |
| 01089 | 00603 | PR | 5 | | |
| 01089 | 00604 | PR | 5 | Y | |
| 01089 | 00605 | PR | 5 | | |
| 01089 | 00606 | PR | 5 | | |

The data in Table 1 provides example data for mailpieces sent from an origin location having shipping location code 01089 to destinations having shipping location codes 00501, 00544, 00601, etc. As used herein, a "mailpiece" may refer to a piece of mail such as a letter, a package, a parcel, or the like, or any other item transported by a postal service, commercial carrier, or similar entity, from a sender to a recipient. The data table indicates the expected number of days the mailpiece will be in transit, and whether each origin/destination is eligible for three-day delivery on Saturday and/or ground delivery on Saturday. It will be understood that the example shown in Table 1 and described in further detail herein only describes operations performed with a small subset of possible data for purposes of illustration. However, embodiments disclosed herein apply equally to larger data sets that may be used by carriers, which may have, for example, multiple origins and destinations for all valid postal codes in the US or other geographic region.

At step 104, the file may be sorted in ascending, contiguous order of origin+destination combinations (as already shown in Table 1). This sort may be performed using any conventional sorting algorithm, such as a bubble sort. In some cases, the original data file provided by a carrier may already be in order and no further sorting may be required.

In some cases, the set of origin/destination shipping location codes that are possible within a particular numbering and assignment scheme may be relatively large. Accordingly, it may be useful at 106 to generate an array that includes the complete list of shipping location codes in alphanumeric order. For example, the five-digit system the United States Post Office uses provides up to one hundred thousand postal codes ($10^5$) ranging from 00000 to 99999. However, only about 40,000 of the possible ZIP codes are actually used due to the process used to assign location codes to geographic locations. This may be used to reduce the amount of data included in a compressed data set that represents information about origin/destination pairs. Furthermore, when building any array, it may be useful to use an array size that is sufficient to contain the smallest set that fits in an eight-bit multiple. Continuing this example, the smallest set is under 65,536 ($2^{16}$). Thus, a translation array may be created that maps the 100,000 possible elements to a 16-bit unsigned integer. The elements may be populated with a translation code starting at "1". To reverse this first-phase encoding, the array element may be used to obtain the translated value. As a specific example, the ZIP code 60606 in array x may be referenced by x[60606] with value 9382, which would indicate that it is the 9,382th valid postal code. That is, at this first step the possible postal codes such as ZIP codes may be numbered in order. At this point only the set of location codes may be used, not entire origin/destination combinations. Table 2 shows an example of the resulting "phase translation matrix" based on the example data in Table 1, for an array "dzip," which may be referred to as the "phase 2" translation matrix:

TABLE 2

| Array Element | Transl. Code |
|---|---|
| dzip[00001] | 0 |
| dzip[00002] | 0 |
| . . . | 0 |
| dzip[00500] | 0 |
| dzip[00501] | 1 |
| dzip[00502] | 0 |
| . . . | 0 |
| dzip[00543] | 0 |
| dzip[00544] | 2 |
| dzip[00545] | 0 |

TABLE 2-continued

| Array Element | Transl. Code |
|---|---|
| dzip[00546] | 0 |
| ... | 0 |
| dzip[00601] | 3 |
| dzip[00602] | 4 |
| dzip[00603] | 5 |
| dzip[00604] | 6 |
| dzip[00605] | 7 |
| dzip[00606] | 8 |

That is, each array element that corresponds to an in-use or otherwise assigned code is assigned a translation code, in order, while each other element is assigned a null or 0 translation code.

At 108, destination arrays may be created to store data for each origin shipping location code. To do so, the process considers points in the ordered list of geographic shipping location codes where the attributes change between codes. This step will build an appropriately-sized temporary structure for each of the origin codes in the entire set.

For example, referring again to Table 1, the two U.S. ZIP codes 00501 and 00544 likely will have identical attributes as they are in the same area of New York. However, the next postal code is 00601, which is in Puerto Rico and likely will have different attributes. Those attributes for the next thirty ZIP codes also may be identical. Thus, in this example range of thirty-two ZIP codes, there are two changes of attributes (between Destination Codes 00544 and 00601, and between Destination Codes 00603 and 00604) and three resultant attribute combinations (for Destination Code ranges 00501-00544, 00601-00603, and 00604-00630). This process may be continued through the entire list of origin/destination codes. As a specific example, in the current U.S. ZIP code list for one carrier, this process produces about 200 sets of postal codes, grouped by attribute.

Based on the result of the arrays created at 108, at 110 memory may be allocated for each origin code in the size of each respective number of changes and a binary array of the data may be generated at 112. Continuing the prior example using U.S. ZIP codes, at this point the total number location codes will have been reduced sufficiently that they all may be represented within a sixteen-bit number. That is, there are five total attribute changes (from null to 1+N+N, to 5+N+Y, to 5+N+N, to 5+Y+N, to 5+N+N). This set may be represented in eight bits. Accordingly, an array of 3 bytes (2 bytes for destination code, 1 byte for attributes) by 5 bytes (total changes) long may be created. The first two bytes may be used to represent the place at which a change occurred (i.e., the border between ZIP code groupings in the ordered list), and the remaining byte may be used to represent the attributes that the change moved to, i.e., the next postal code in the ordered list. Should the attributes take up more than eight bits, additional bytes may be allocated per unit element to represent it.

Because the data has been sorted, an initial implied element of zero with a null value of attributes may be created. The first element then represents the first postal code in the first set of postal codes grouped by attribute. Continuing the previous example, the first element would represent ZIP code 00501—the point at which point the attributes change from null (no attributes) to attributes for 00501, which are shared by other codes in the group. This is translatable through the "phase 2 matrix" shown in Table 2 to element "1" (binary 0000000000000001 as an unsigned 16-bit integer). This may be stored with one or more bits of attribute data; continuing the prior example, it may be stored with two bits of attribute data for a total of three bytes of data. The next element then represents the attributes for the next set of postal codes, e.g., 00601-00630 in the example above. The translation matrix as shown in Table 2 translates the 00601 to element "3" (binary 0000000000000011) plus eight additional bits of its attributes. Element three represents the next set of codes starting with 00631, and so on. FIG. 2 shows an example of a populated binary array for the first 5 entries, following the example above, presuming the above encoding. This example illustrates one line per array element, each element 3 bytes/24 bits long. The first two bytes represent the encoded ZIP at which an element changes (in this example, an attribute transition occurred at zip 00501, 00601, 00602, 00604, and 00605).

As each origin code is iterated through, at 114 a map is built in parallel of sixteen-bit unsigned integers pointing to the appropriate output structures. This mapping may be referred to as an "Origin Pointer" matrix. Similar to the phase 2 translation matrix, the origin pointer matrix may provide a mechanism to map an origin code to a 16-bit equivalent, after which the mapping may be used to point to the cardinality in the compressed data matrix. Initially this will mirror the phase 2 table, but an advantage of the resulting duplicity will be evident when the origin codes are examined to remove duplicates. Continuing the example above, the origin pointer matrix "ozip" for the example data is shown in Table 3:

TABLE 3

| Array Element | Pointer Value |
|---|---|
| ozip[00001] | 0 |
| ozip[00002] | 0 |
| ... | 0 |
| ozip[01088] | 0 |
| ozip[01089] | 1 |
| ozip[01090] | 0 |
| ... | 0 |
| ozip[99999] | 0 |

As previously noted, the sample data and resulting matrices described herein represent an illustrative sample of data that would be expected for a complete set of shipping location codes for a given geographic region or mailing system. For example, although Table 3 indicates that all matrix entries after 01089 would be 0, in a complete system one would expect additional codes between 01089 and 99999 to be used. The systems and techniques disclosed herein may be used regardless of how many codes are actually in use, and also may be used regardless of the possible number of codes in a particular system while still achieving the advantages and benefits disclosed herein.

At 116, origin shipping location codes may be analyzed to identify and remove any duplicates in the structure. Essentially, the same process is performed for origin shipping location codes that was initially performed for destination shipping location codes. Furthermore, if a user is shipping within a continuous group of postal codes, the origin and destination attributes are the same. Just as destinations of geographically-similar data may allow for efficient data compression, so too can origins. The resulting groups of postal codes are then compared to see if they match any others. This may be performed in-memory, since a sufficient portion of memory has already been allocated in previous steps. It may be preferred for each output to be compared against each other output to achieve improved compression.

Furthermore, to improve the efficiency of this comparison, a hash function may be used for the individual arrays, and then the entire set may be iterated through by comparing the hash to all successive hashes. If the destination hash is the same, the entire array may then be compared to rule out any hash collisions. If it is determined they are identical, an "output pointer" matrix may be updated so origins that match all point to one and only one of the output structures. The destination hash can be set to null so it is taken out of future comparisons for efficiency. FIG. 3 shows an example of a transformation of the origin pointer matrix to the de-duplicated output pointer matrix, following the example previously described and shown in Table 3.

Because each individual origin structure is a multiple of three bytes and the individual length (e.g. number of changes in attributes) is known, a "master" array may be created by concatenating each individual array. This master array then may be stored for loading as a single object. To unwind the master array during use, the origin pointer matrix may be changed from the ordinal of output pointer matrixes, to the start location in the final output. Following the example above, the origin structures for shipping location codes 00501 and 00544 (assuming they were both a provided origin) would occupy the first two output matrix slots (as the lowest postal codes). The origin pointer matrix may then be de-duplicated as disclosed herein, so that the two output matrix slots both point to the first structure. Continuing the example, origin shipping location codes 00601 to 00630 would be contained to the third (and successive) origin structure object "3". If the first matrix included, for example, one hundred changes, it would occupy 300 bytes of memory, and the next structure may be allocated starting at byte 301. The origin pointer matrix then may be translated to point instead at the 101st element of the first (and only) structure, rather than at the first byte of a different and distinct structure. This resulting structure may be referred to as a "master" attribute matrix.

At 118, the final structure may be written to disk or otherwise recorded on a transferable medium or transmitted to customers or other end users for use in shipping systems. To use the compressed data, a user system may use the translation ("phase 2") matrix, the output pointer matrix, and the summation "master" attribute matrix. The complete contents of this structure then may be provided to end users. Alternatively, it may be further compressed using a conventional encoding algorithm, and the resultant structure written to disk for distribution to end users. For example, the contents may be compressed using conventional text or binary compression techniques, and then decompressed by end users prior to use.

For ease of implementation in searching, a bound matrix may be created for each origin shipping location code, which indicates not only the start point for the code, but how many elements are assigned to that origin(s) to avoid a bounds overflow in searching.

The compressed data may represent a significant compression over the original format; as previously disclosed, the gain in space may be several orders of magnitude. It may be further compressed using any known or existing generic compression algorithms before writing to disk. This also may provide a cyclic redundancy check to assure the integrity of the data as a whole. Notably, the computational gains provided by the techniques disclosed herein are available regardless of whether this additional compression step is performed, since it merely uses conventional compression to slightly reduce the size of the stored data. The primary efficiency gain results from the custom compression techniques available for this particular data, as opposed to gains that result from conventional generic compression techniques.

For ease of searching during use, an optional bound matrix may be created for each origin so that not only the start point is known, but also the total number of elements that are assigned to that origin or origins. This prevents a bounds overflow in searching. Without this feature, it is still possible to assure that each value checked is higher than the previous; if it is lower, the end of that origin point has been reached and the search is over. The use of the bounds matrix typically adds about 200 KB to the total file size, but may increase the efficiency of searching in some languages and implementations.

Although examples and illustrations are provided herein with reference to U.S. ZIP codes, it will be readily apparent to one of skill in the art that embodiments of the invention disclosed herein may be used with postal codes in other countries or geographic regions. For example, most countries assign alphanumeric postal codes based on geography. The embodiments disclosed herein may be applied directly in such cases, following conventional rules and techniques for sorting alphanumeric strings at the appropriate phases of the techniques disclosed herein. Similarly, techniques disclosed herein may be used in areas that do not have government-assigned postal codes by assigning arbitrary identifiers based on carrier services available in various geographic regions. In such a case, the arbitrary identifiers may be sorted and grouped according to the embodiments disclosed herein, thereby achieving the same efficiencies and benefits disclosed herein.

Figure 4:
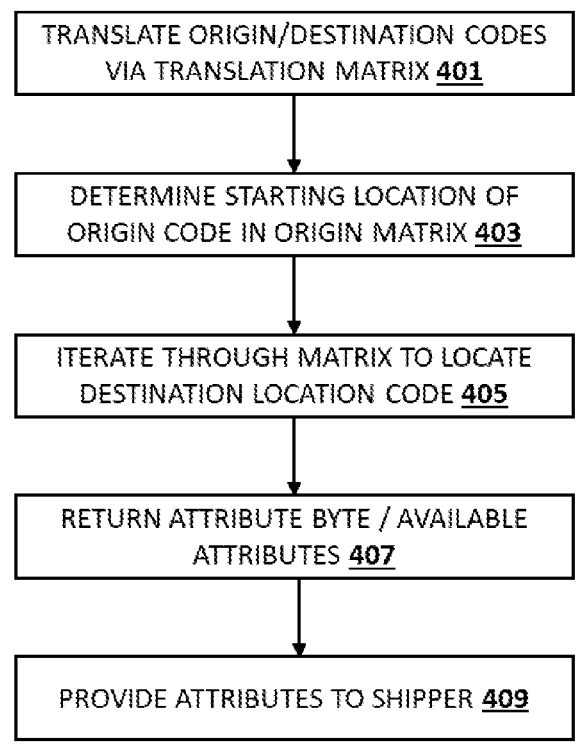
FIG. 4 shows an example process for using compressed data according to an embodiment disclosed herein.

FIG. 4 shows an example process for obtaining attributes for an example origin/destination shipping location code pair using compressed data as disclosed herein, i.e., the reverse process as described with respect to FIG. 1. A process as shown in FIG. 4 may be used, for example, when a shipper is selecting a carrier and/or options to ship a package, such as when a customer of a larger retailer is selecting shipping options for an order placed through the retailer. At 401, the origin and destination shipping location codes may be translated using a translation matrix as described with respect to Table 2. This step also may validate that the user input valid combinations, since invalid codes will be immediately apparent upon retrieving their corresponding translation codes. This in turn may prevent issuance of a false positive attribute set for a pair that is not represented in the original data. As a specific example, an origin code of "60647" and destination code of "90210" may translate to "1337" and "49152", respectively.

At 403, the origin matrix pointer is used to determine the location in which the resultant origin code begins. In this example, the matrix is used to identify the element at which the origin number 1337 begins. For example, it may point to the 285,153th element in the structure.

The process then iterates through the data structure at 405 to determine whether the value encompassed by the identified element includes the indicated destination location code, 49152 in this example. The structure may be searched beginning at the identified element, or a search algorithm such as a binary search may be used. Continuing the example described above with respect to FIG. 1 as well as this example, the first element represents 00501-00504 (ordinal "1"), the second element (ordinal "2") represents 00601-00630, the third 00631+, and so on. In some cases, as previously disclosed the first ordinal may actually represent 00501-00601, since the compressed data structure record where the change occurs and assumes invalid postal codes are filtered out in the Phase 2 matrix. The lower bound is known from the first two bytes, and it may be assumed that the upper bound is one less than the first two bytes of the next element in the array due to the structure previously disclosed with respect to FIG. 1.

When the element is reached that encompasses the resultant translated destination location code at 407, the process references and returns the attribute byte. This then may be used to provide an indication of the attributes available for the selected origin/destination code pair via a data transfer, user interface, or the like at 409.

As used herein, "attributes" of an origin/destination combination may include any information related to delivery from the origin to the destination, which may be specific to the origin/destination combination or may apply to multiple combinations. Examples of origin/destination attributes may include the number of days required for the carrier to deliver; an indicator of whether delivery is available on weekends, morning/evening, or the like; whether expedited delivery is available; and so on. Different carriers may provide different attributes, such as where different carriers have different service levels or other shipping options. The attributes may be used, for example, by a user to select or provide shipping options. As a specific example, a retailer may use the attributes to select the shipping options that are provided to in-store or Internet-based customers.

Although various examples and embodiments have been described herein with reference to origin and destination shipping location codes that use U.S. ZIP codes, it will be understood that the techniques and systems are not limited to the ZIP postal code system used in the U.S., and that any set of location codes may be used without departing from the scope or spirit of the embodiments disclosed herein. Specifically, techniques and systems disclosed herein may be used with postal code systems used in other countries or other geographic regions, which may include alphanumeric postal codes that include more or fewer characters and different sets of characters than those used in U.S. ZIP codes. Furthermore, embodiments disclosed herein or equivalents thereof may be used to compress other arbitrary data that has the same features as the location codes discloses herein. For example, product identifiers for a type or source of consumer goods may have groupings of features similar to those disclosed herein for location codes, and may be offered to purchasers in different combinations depending upon inventory or feature set in the same way that origin/destination routes are offered to customers as disclosed herein. Similar benefits thus may be achieved by applying the compression techniques disclosed herein to those product identifiers.

Figure 5:
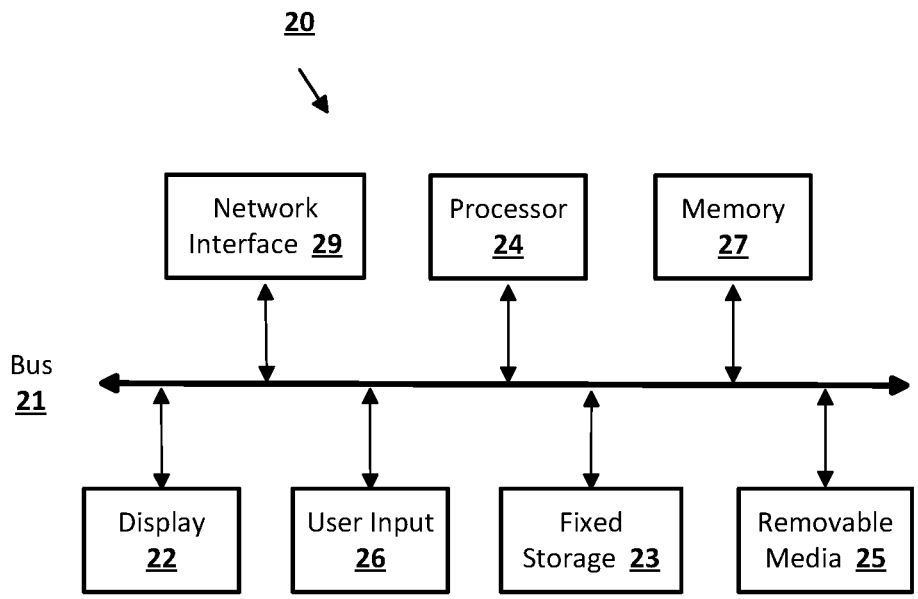
FIG. 5 shows an example computer system suitable for implementation of embodiments disclosed herein.

Embodiments disclosed herein may be implemented in and on, and used with a variety of computerized systems and network architectures. Such systems may be used to implement the techniques disclosed herein, such as those described with respect to FIGS. 1-4, and/or they may interface with such systems, such as where origin/destination data as disclosed herein is subsequently provided to a separate computerized system. FIG. 5 is an example computing device 20 suitable for implementing or interfacing with embodiments of embodiments disclosed herein. The device 20 may be, for example, a desktop or laptop computer, a server cloud-based computer system, a mobile computing device such as a smart phone, tablet, or the like. The device 20 may include a bus 21 which interconnects major components of the computer 20, such as a central processor 24, a memory 27 such as Random Access Memory (RAM), Read Only Memory (ROM), flash RAM, or the like, a user display 22 such as a display screen, a user input interface 26, which may include one or more controllers and associated user input devices such as a keyboard, mouse, touch screen, and the like, a fixed storage 23 such as a hard drive, flash storage, and the like, a removable media component 25 operative to control and receive an optical disk, flash drive, and the like, and a network interface 29 operable to communicate with one or more remote devices via a suitable network connection. The bus 21 allows data communication between the central processor 24 and one or more memory components. Applications generally are stored on and accessed via a computer readable medium, such as a hard disk drive (e.g., fixed storage 23), an optical drive, floppy disk, or other storage medium.

The fixed storage 23 may be integral with the computer 20 or may be separate and accessed through other interfaces. The network interface 29 may provide a direct connection to a remote server via a wired or wireless connection. The network interface 29 may provide such connection using any suitable technique and protocol as will be readily understood by one of skill in the art, including digital cellular telephone, WiFi, Bluetooth®, near-field, and the like. For example, the network interface 29 may allow the computer to communicate with other computers via one or more local, wide-area, or other communication networks, as described in further detail below.

Figure 6:
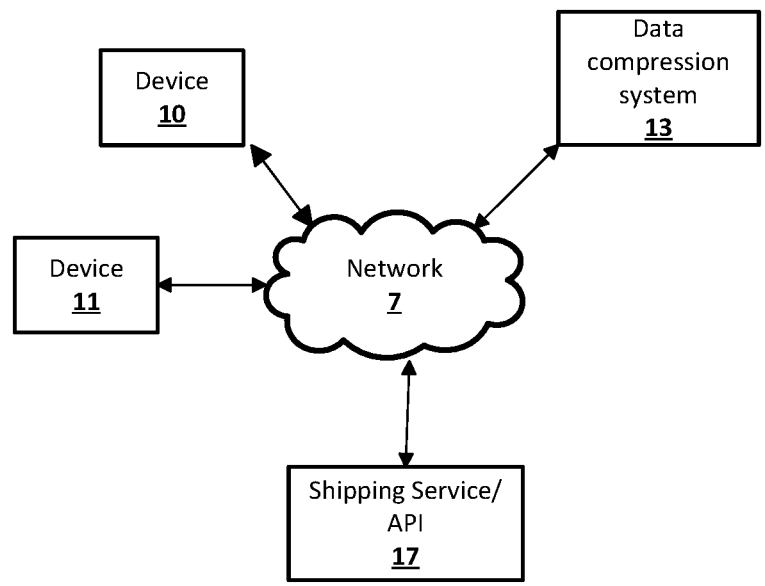
FIG. 6 shows an example computer network communications system suitable for use with embodiments disclosed herein.

FIG. 6 shows an example network arrangement according to an embodiment disclosed herein. As previously described, a computerized data compression system 13 may be configured to obtain origin/destination information as disclosed herein, and compress it for efficient transmission to and/or use by one or more other systems such as a shipping service or application programming interface (API) 17. One or more devices 10, 11, such as local computers, smart phones, tablet computing devices, and the like may connect to the processing system via one or more networks 7. The network may be a local network, wide-area network, the Internet, or any other suitable communication network or networks, and may be implemented on any suitable platform including wired and/or wireless networks. Each device may be a computing device as previously described with respect to FIG. 5. A remote platform or service such as a shipping service 17, which may itself include one or more computing systems and/or networks, may provide use compressed data received from the compression system 13 as previously disclosed. The compression system 13 may be implemented on one or more computers or computerized systems such as described with respect to FIG. 5, cloud computing systems or other hosted systems, or any other suitable computerized system. More generally, embodiments disclosed herein may be implemented on, and/or used with, any suitable computerized processing system, including conventional server/client architecture systems, distributed computing platforms, microservice implementations on cloud platforms that do not rely on or expose specific hardware configurations, or the like.

More generally, various embodiments of the presently disclosed subject matter may include or be embodied in the form of computer-implemented processes and apparatuses for practicing those processes. Embodiments also may be embodied in the form of a computer program product having computer program code containing instructions embodied in non-transitory and/or tangible media, such as floppy diskettes, CD-ROMs, hard drives, USB (universal serial bus) drives, or any other machine readable storage medium, such that when the computer program code is loaded into and executed by a computer, the computer becomes an apparatus for practicing embodiments of the disclosed subject matter.

Embodiments also may be embodied in the form of computer program code, for example, whether stored in a storage medium, loaded into and/or executed by a computer, or transmitted over some transmission medium, such as over electrical wiring or cabling, through fiber optics, or via electromagnetic radiation, such that when the computer program code is loaded into and executed by a computer, the computer becomes an apparatus for practicing embodiments of the disclosed subject matter. When implemented on a general-purpose microprocessor, the computer program code segments configure the microprocessor to create specific logic circuits.

In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Embodiments may be implemented using hardware that may include a processor, such as a general purpose microprocessor and/or an Application Specific Integrated Circuit (ASIC) that embodies all or part of the techniques according to embodiments of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to embodiments of the disclosed subject matter.

The foregoing description, for purpose of explanation, has been described with reference to specific embodiments. However, the illustrative discussions above are not intended to be exhaustive or to limit embodiments of the disclosed subject matter to the precise forms disclosed. Many modifications and variations are possible in view of the above teachings. The embodiments were chosen and described in order to explain the principles of embodiments of the disclosed subject matter and their practical applications, to thereby enable others skilled in the art to utilize those embodiments as well as various embodiments with various modifications as may be suited to the particular use contemplated.

What is claimed is:

1. A method comprising steps performed by at least one processor:
   obtaining an initial set of origin/destination shipping location code pairs, each pair comprising an origin code indicating a geographic origin location from which a mailpiece can be shipped and a destination code indicating a geographic destination location to which a mailpiece can be delivered;
   generating an ordered list of the origin/destination shipping location code pairs based upon the origin code for each pair;
   based upon the ordered list, generating a translation code array that maps shipping location codes to smaller translation codes;
   identifying one or more break points in the ordered list at which attributes for consecutively-ordered origin/destination shipping location code pairs change;
   based upon the one or more break points and each origin shipping location code in the ordered list, generating one or more destination code arrays of destination shipping location codes and associated attributes, wherein each destination shipping location code in each destination code array is a first destination shipping location code occurring after one of the one or more break points and is represented by an associated translation code;
   generating an origin code array that maps each origin shipping location code to an associated destination code array;
   modifying the origin code array so that origin shipping location codes that have common origin/destination attributes map to a common destination code array; and
   providing the translation code array, the origin code array, and the one or more destination code arrays to a shipping selection system.

2. The method of claim 1, wherein the shipping selection system is configured to use the translation code array, the one or more destination code arrays, and the origin code array to identify and provide shipping options to a shipper in response to a request to ship a mailpiece.

3. The method of claim 1, further comprising:
   compressing the translation code array, the one or more destination code arrays, and the origin code array prior to providing them to the shipping selection system.

4. The method of claim 1, wherein at least one of the translation code array, the one or more destination code arrays, and the origin code array is provided in the form of a binary array.

5. The method of claim 1, wherein each shipping location code corresponds to a U.S. ZIP code.

6. A system comprising:
   a processor configured to:
      obtain an initial set of origin/destination shipping location code pairs, each pair comprising an origin code indicating a geographic origin location from which a mailpiece can be shipped and a destination code indicating a geographic destination location to which a mailpiece can be delivered;
      generate an ordered list of the origin/destination shipping location code pairs based upon the origin code for each pair;
      based upon the ordered list, generate a translation code array that maps shipping location codes to smaller translation codes;
      identify one or more break points in the ordered list at which attributes for consecutively-ordered origin/destination shipping location code pairs change;
      based upon the one or more break points and each origin shipping location code in the ordered list, generate one or more destination code arrays of destination shipping location codes and associated attributes, wherein each destination shipping location code in each destination code array is a first destination shipping location code occurring after one of the one or more break points and is represented by an associated translation code;
      generate an origin code array that maps each origin shipping location code to an associated destination code array; and
      modify the origin code array so that origin shipping location codes that have common origin/destination attributes map to a common destination code array; and
   a computerized communications interface configured to provide the translation code array, the origin code array, and the one or more destination code arrays to a shipping selection system.

7. The system of claim 6, wherein the shipping selection system is configured to use the translation code array, the one or more destination code arrays, and the origin code array to identify and provide shipping options to a shipper in response to a request to ship a mailpiece.

8. The system of claim 6, said processor further configured to compress the translation code array, the one or more destination code arrays, and the origin code array prior to providing them to the shipping selection system.

9. The system of claim 6, wherein at least one of the translation code array, the one or more destination code arrays, and the origin code array is provided in the form of a binary array.

10. The system of claim 6, wherein each shipping location code corresponds to a U.S. ZIP code.

11. A non-transitory computer-readable medium storing a plurality of instructions which, when executed by a processor, cause the processor to execute a method comprising:
   obtaining an initial set of origin/destination shipping location code pairs, each pair comprising an origin code indicating a geographic origin location from which a mailpiece can be shipped and a destination code indicating a geographic destination location to which a mailpiece can be delivered;
   generating an ordered list of the origin/destination shipping location code pairs based upon the origin code for each pair;
   based upon the ordered list, generating a translation code array that maps shipping location codes to smaller translation codes;
   identifying one or more break points in the ordered list at which attributes for consecutively-ordered origin/destination shipping location code pairs change;
   based upon the one or more break points and each origin shipping location code in the ordered list, generating one or more destination code arrays of destination shipping location codes and associated attributes, wherein each destination shipping location code in each destination code array is a first destination shipping location code occurring after one of the one or more break points and is represented by an associated translation code;
   generating an origin code array that maps each origin shipping location code to an associated destination code array;
   modifying the origin code array so that origin shipping location codes that have common origin/destination attributes map to a common destination code array; and
   providing the translation code array, the origin code array, and the one or more destination code arrays to a shipping selection system.

12. The non-transitory computer-readable medium of claim 11, wherein the shipping selection system is configured to use the translation code array, the one or more destination code arrays, and the origin code array to identify and provide shipping options to a shipper in response to a request to ship a mailpiece.

13. The non-transitory computer-readable medium of claim 11, the method further comprising:
   compressing the translation code array, the one or more destination code arrays, and the origin code array prior to providing them to the shipping selection system.

14. The non-transitory computer-readable medium of claim 11, wherein at least one of the translation code array, the one or more destination code arrays, and the origin code array is provided in the form of a binary array.

15. The non-transitory computer-readable medium of claim 11, wherein each shipping location code corresponds to a U.S. ZIP code.

* * * * *